US012598368B2

(12) United States Patent
Li et al.

(10) Patent No.: US 12,598,368 B2
(45) Date of Patent: Apr. 7, 2026

(54) ELECTRONIC DEVICE, AND CAMERA MODULE THEREOF WHEREIN A LENS IS IN MOVEABLE FIT WITH A LIMITING MEMBER HAVING FIRST THROUGH FOURTH LIMITING GROOVES IN COMMUNICATION WITH EACH OTHER

(71) Applicant: VIVO MOBILE COMMUNICATION CO., LTD., Guangdong (CN)

(72) Inventors: Peide Li, Guangdong (CN); Chun Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 343 days.

(21) Appl. No.: 18/340,606

(22) Filed: Jun. 23, 2023

(65) Prior Publication Data

US 2023/0336859 A1      Oct. 19, 2023

Related U.S. Application Data

(63) Continuation of application No. PCT/CN2021/141870, filed on Dec. 28, 2021.

(30) Foreign Application Priority Data

Dec. 31, 2020    (CN) .......................... 202011641273.6

(51) Int. Cl.
| | | |
|---|---|---|
| *H04N 5/335* | (2011.01) | |
| *H04N 23/55* | (2023.01) | |
| *H04N 23/58* | (2023.01) | |

(52) U.S. Cl.
CPC ............. *H04N 23/55* (2023.01); *H04N 23/58* (2023.01)

(58) Field of Classification Search
CPC ...................................................... H04N 25/48
See application file for complete search history.

(56) References Cited

U.S. PATENT DOCUMENTS

| | | | | |
|---|---|---|---|---|
| 5,193,596 A | * | 3/1993 | Patel | .................... B23Q 35/102 |
| | | | | 83/413 |
| 9,871,964 B2 | * | 1/2018 | Miyata | ................. H04N 23/951 |

(Continued)

FOREIGN PATENT DOCUMENTS

| | | |
|---|---|---|
| CN | 104079904 A | 10/2014 |
| CN | 106210677 A | 12/2016 |

(Continued)

OTHER PUBLICATIONS

Extended European Search Report for Application No. 21914334.4, dated Apr. 23, 2024, 9 Pages.

(Continued)

*Primary Examiner* — Gary C Vieaux
(74) *Attorney, Agent, or Firm* — BROOKS KUSHMAN P.C.

(57) ABSTRACT

Electronic device and camera module thereof are provided. Camera module includes lens, driving member, and photosensitive chip which is Bayer array sensor and includes pixel areas in rows and columns, and each pixel area includes four sub pixel areas. Lens is connected to driving member that can drive lens to switch between first position and second position relative to photosensitive chip. If lens is at first position, light incident from lens forms first image in first sub pixel area of photosensitive chip. If lens is at second position, light incident from lens forms second image in second sub pixel area of photosensitive chip. Content of first image is same as that of second image. Equivalent sub pixel areas of first and second sub pixel areas in one pixel area are any two sub pixel areas in the pixel area.

12 Claims, 4 Drawing Sheets

(56) References Cited

U.S. PATENT DOCUMENTS

| | | | | |
|---|---|---|---|---|
| 10,687,033 | B2* | 6/2020 | Wan | H04N 25/13 |
| 2002/0060743 | A1 | 5/2002 | Hori | |
| 2006/0087561 | A1 | 4/2006 | Kojima et al. | |
| 2010/0172020 | A1 | 7/2010 | Price et al. | |
| 2012/0236190 | A1* | 9/2012 | Ogasahara | H04N 25/131 |
| | | | | 348/E9.01 |
| 2014/0267890 | A1 | 9/2014 | Lelescu et al. | |
| 2016/0366335 | A1 | 12/2016 | Miyata et al. | |
| 2017/0109865 | A1 | 4/2017 | Kim et al. | |
| 2017/0118453 | A1 | 4/2017 | Kim et al. | |
| 2018/0139395 | A1* | 5/2018 | Toyoda | H04N 23/673 |
| 2018/0264866 | A1 | 9/2018 | Raymond et al. | |
| 2020/0099898 | A1 | 3/2020 | Wan | |
| 2020/0314347 | A1 | 10/2020 | Kageyama et al. | |
| 2021/0092291 | A1* | 3/2021 | Lee | H04N 25/48 |
| 2022/0368866 | A1 | 11/2022 | Wang et al. | |

FOREIGN PATENT DOCUMENTS

| | | | |
|---|---|---|---|
| CN | 108965703 | A | 12/2018 |
| CN | 111602387 | A | 8/2020 |
| CN | 112616009 | A | 4/2021 |
| EP | 1207685 | A2 | 5/2002 |
| EP | 3758354 | A1 | 12/2020 |
| JP | 2000013670 | A | 1/2000 |
| JP | 2002159014 | A | 5/2002 |
| JP | 2006128780 | A | 5/2006 |
| JP | 2012506060 | A | 3/2012 |
| JP | 2012253581 | A | 12/2012 |
| JP | 2017005555 | A | 1/2017 |
| WO | 2010044870 | A1 | 4/2010 |
| WO | 2020015627 | A1 | 1/2020 |

OTHER PUBLICATIONS

First Office Action for Japanese Application No. 2023-540121, dated Jun. 25, 2024, 11 Pages.

First Office Action for Chinese Application No. 202011641273.6, dated Dec. 3, 2021, 8 Pages.

International Search Report and Written Opinion for Application No. PCT/CN2021/141870, dated Feb. 9, 2022, 9 Pages.

* cited by examiner

ELECTRONIC DEVICE, AND CAMERA MODULE THEREOF WHEREIN A LENS IS IN MOVEABLE FIT WITH A LIMITING MEMBER HAVING FIRST THROUGH FOURTH LIMITING GROOVES IN COMMUNICATION WITH EACH OTHER

CROSS-REFERENCE TO RELATED APPLICATIONS

This application is a continuation application of International Application No. PCT/CN2021/141870 filed on Dec. 28, 2021, which claims priority to Chinese Patent Application No. 202011641273.6, filed on Dec. 31, 2020, which are incorporated herein by reference in their entireties.

TECHNICAL FIELD

This application relates to the field of communications device technologies, and in particular to an electronic device and a camera module thereof.

BACKGROUND

With the development of technologies, mobile phones and other electronic devices play an important role in people's production and life, and the electronic devices are usually equipped with camera modules to help users take photos. With the increasingly fierce market competition, an electronic device usually has at least one outstanding performance to stand out from other electronic devices, thereby improving the market competitiveness of the electronic device. For example, the electronic device has a high refresh rate, which makes it have a high display performance; the electronic device has two speakers, so that a sound effect is good; or further, the electronic device has high shooting performance. For the shooting performance of the electronic device, performance of a camera module can be improved in many ways.

Using imaging resolution as an example, when a size of a photosensitive chip is fixed, increasing a quantity of pixels reduces photosensitivity of the camera module, and also adversely affect an imaging result. Therefore, the industry usually uses single-frame interpolation and multi-frame synthesis to improve the resolution. However, in a process of forming an image by using the single-frame interpolation, because a quantity of real photosensitive pixels does not increase, improvement effect on the resolution is limited, and interpolation errors are also prone to occur in some scenes. In a process of forming an image by multi-frame synthesis, it is difficult to control pixel displacement, and the image quality after the synthesis is also poor.

SUMMARY

According to a first aspect, an embodiment of this application discloses a camera module. The camera module includes a lens, a driving member and a photosensitive chip. The photosensitive chip is a Bayer array sensor, the photosensitive chip includes a plurality of pixel areas that are arranged in rows and columns, and each pixel area includes four sub pixel areas.

The lens is connected to the driving member, and the driving member can drive the lens to switch between a first position and a second position relative to the photosensitive chip.

In a case that the lens is at the first position, light incident from the lens forms a first image in a first sub pixel area of the photosensitive chip. In a case that the lens is at the second position, the light incident from the lens form a second image in a second sub pixel area of the photosensitive chip. A content of the first image is the same as that of the second image, and equivalent sub pixel areas of the first sub pixel area and the second sub pixel area in one pixel area are any two of the sub pixel areas in the pixel area.

According to a second aspect, an embodiment of this application discloses an electronic device, including the foregoing camera module.

BRIEF DESCRIPTION OF DRAWINGS

The accompanying drawings described herein are intended to provide a further understanding of this application, and constitute a part of this application. Example embodiments of this application and descriptions thereof are intended to describe this application, and do not constitute limitations on this application. In the accompanying drawings.

Reference signs in the accompanying drawings:

100. housing;

200. lens;

400. photosensitive chip; 401. first sub pixel area; 402. second sub pixel area; 403. third sub pixel area; 404. fourth sub pixel area; 401'. first sub pixel area; 402'. second sub pixel area; 403'. third sub pixel area; 404'. fourth sub pixel area;

500. infrared cut-off filter;

600. limiting member; 601. limiting base; 602. connecting part; and 603. movable space; first limiting groove, 6031; second limiting groove, 6032; third limiting groove, 6033; fourth limiting groove, 6034.

DETAILED DESCRIPTION

To make the objectives, technical solutions, and advantages of this application clearer, the following clearly describes the technical solutions of this application with reference to the specific embodiments of this application and the corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

The technical solutions disclosed in embodiments of this application are described in detail below with reference to the accompanying drawings.

Figure 1:
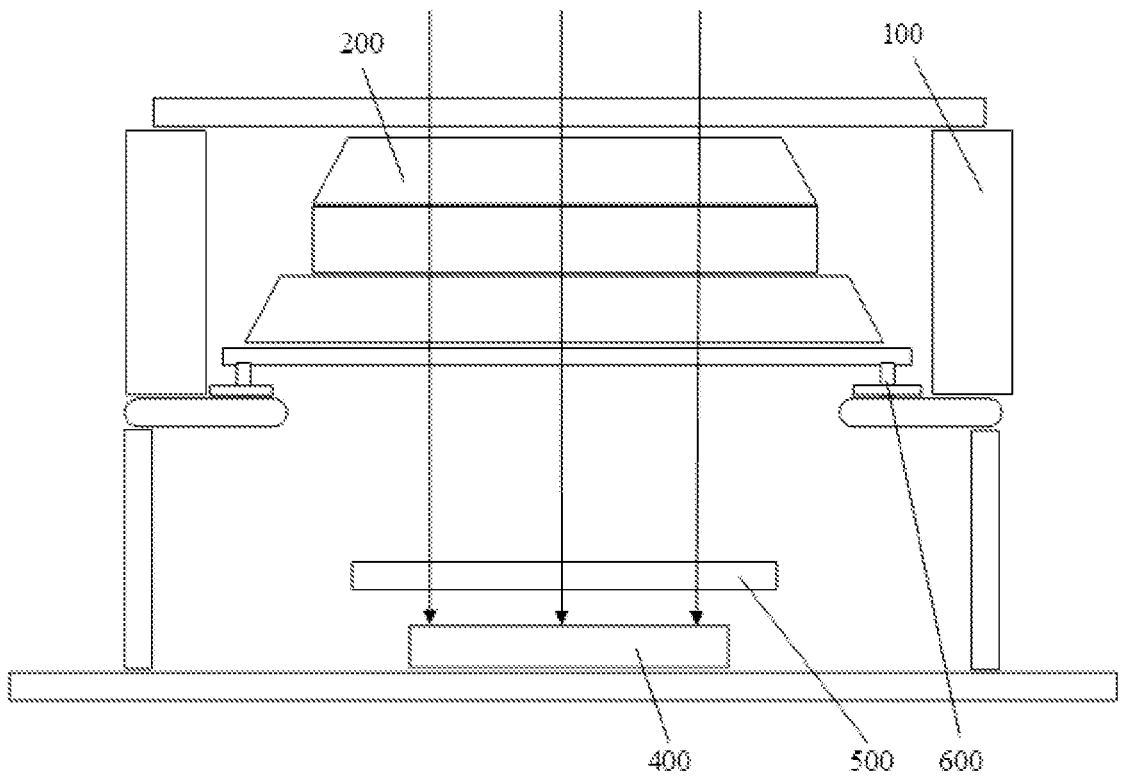
FIG. 1 is a schematic diagram depicting a structure of a camera module according to an embodiment of this application.
Figure 2:
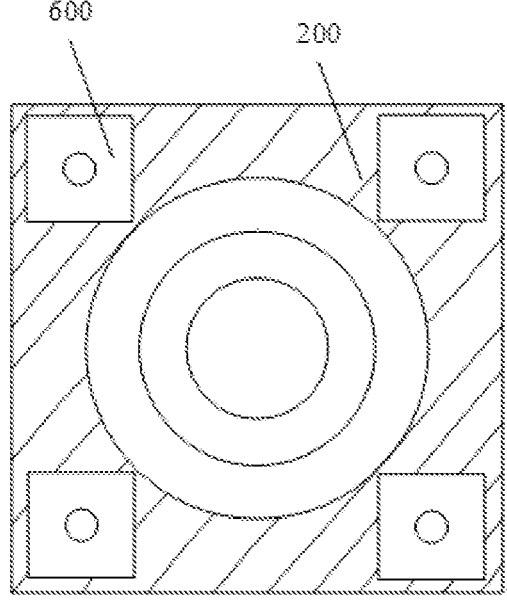
FIG. 2 is a diagram of assembly of a lens and a limiting member in a camera module according to an embodiment of this application.
Figure 3:
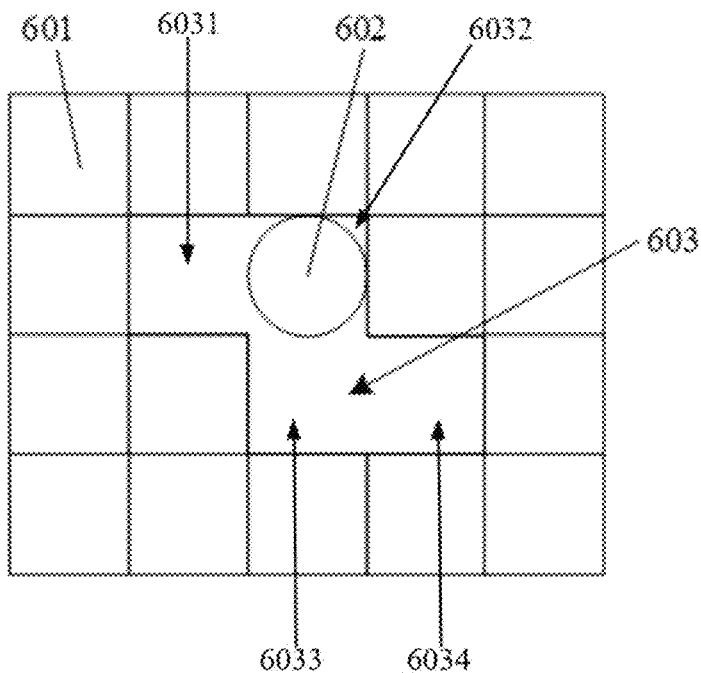
FIG. 3 is a schematic diagram of a limiting member in a camera module according to an embodiment of this application.

As shown in FIG. 1 to FIG. 3, this application discloses a camera module. The camera module includes a lens 200, a driving member, and a photosensitive chip 400. In addition, the camera module further includes a housing 100. All the foregoing devices can be installed on the housing 100. The housing 100 may be made from a material such as plastic or metal. Certainly, the camera module may also be provided with another structure. For brevity, details are not described herein again.

The photosensitive chip 400 is an imaging sensor, and the photosensitive chip 400 is a Bayer array sensor, that is, photosensitive pixels in the photosensitive chip 400 are arranged in a manner of Bayer array. The photosensitive chip 400 includes a plurality of pixel areas that are arranged in rows and columns. Each pixel area includes four sub pixel areas, and the four sub pixel areas are arranged in a 2×2 matrix. The four sub pixel areas may include two green pixels, one blue pixel, and one red pixel, and the two green pixels are arranged diagonally. The four sub pixel areas in each pixel area may be a first sub pixel area, a second sub pixel area, a third sub pixel area, and a fourth sub pixel area.

In general, the photosensitive chip 400 may include a filtering array layer and a photosensitive layer. Light pass through the filtering array layer and shine on the photosensitive layer. The filtering array layer can filter colors, which can make the light that passes through the filtering array layer retain only one color such as red, blue, or green.

As mentioned above, the photosensitive chip 400 includes the plurality of pixel areas, and each pixel area includes the four sub pixel areas. In detail, each sub pixel area is a part of the photosensitive chip 400, that is, each sub pixel area may include a sub filtering layer and a sub photosensitive layer, and there is a plurality of sub pixel areas. Further, all sub filtering layers together form the filtering array layer, and all sub photosensitive layers together form the photosensitive layer.

In the filtering array layer of the Bayer array sensor, a part corresponding to each pixel area is provided with four filters, and the four filters correspond to four sub pixel areas respectively in one pixel area. In addition, the above four filters usually include a red light filter, a blue light filter, and two green light filters, and the four filters are called RGGB for short. In a case that types of the filters disposed in different sub pixel areas of the photosensitive layer are different, the colors of images formed by the areas corresponding to the different sub pixel areas of the photosensitive layer are also different.

In the camera module provided in this embodiment of this application, the lens 200 is connected to the driving member. The driving member can drive the lens 200 to move relative to the photosensitive chip 400, so that the photosensitive chip 400 is fixed, and only the lens 200 is controlled to move, thereby improving control accuracy and reducing difficulty of controlling.

Specifically, the photosensitive chip 400 may be fixedly connected to the housing 100, and the lens 200 can form a movable connection relationship with the housing 100 by using the driving member. The photosensitive chip 400 may be fixed on the housing 100 in a manner such as bonding. The driving member may be a miniature linear motor, and the like. The driving member may be installed on the housing 100 by using a connecting part such as a screw, and the lens 200 may be connected to a driving head of the driving member, so that the driving member can drive the lens 200 to move relative to the housing 100, that is, the lens 200 and the photosensitive chip 400 can generate relative motion.

More specifically, the driving member can drive the lens 200 to switch between a first position and a second position relative to the photosensitive chip 400. In the above case, a relative position between the lens 200 and the photosensitive chip 400 can be changed by adjusting the position of the lens 200, so that the light incident from a same position on the lens 200 can be projected at different positions on the photosensitive chip 400, and images with a same content are formed at different positions on the photosensitive chip 400.

In a case that the lens 200 is at the first position, the light incident from the lens 200 forms a first image in the first sub pixel area of the photosensitive chip 400. In a case that the lens 200 is at the second position, the light incident from the lens 200 forms a second image in the second sub pixel area of the photosensitive chip 400.

It should be noted that after one of the first image and the second image is formed, and the driving member drives the lens 200 changes its position, the other image is formed. Because the lens 200 has a certain displacement relative to a framing area between the two imaging processes, there are some differences between the two images that are formed successively. However, in general, edges of the image formed on the photosensitive chip 400 are not displayed in a finally-edited image, and the displacement of the lens 200 is extremely small. Therefore, in a case that the camera module remains fixed as a whole, it can be considered that contents of the images formed after the two imaging processes are basically the same, and further, it can be ensured that contents of the first image and the second image formed in one sub pixel area of the photosensitive chip 400 are the same.

Because the relative positions of the lens 200 and the photosensitive chip 400 change during the formation of the first image and the second image, the positions at which the light projected on the photosensitive chip 400 through the lens 200 can also change, that is, the first image is formed in the first sub pixel area of the photosensitive chip 400, and the second image is formed in the second sub pixel area of the photosensitive chip 400.

When the displacement of the lens 200 is different, spacing between the first sub pixel area and the second sub pixel area is also different, so that it may occur that the first sub pixel area and the second sub pixel area are not located in the same pixel area. However, even if the first sub pixel area and the second sub pixel area are located in two pixel areas respectively, because both the first sub pixel area and the second sub pixel area corresponds to filters, and structures of the plurality of pixel areas on the photosensitive chip 400 are the same, the pixel area in which the first sub pixel area is located must include a sub pixel area that is the same as the filter corresponding to the second sub pixel area. Accordingly, the pixel area in which the second sub pixel area is located must also include a sub pixel area that is the same as the filter corresponding to the first sub pixel area. Therefore, the first sub pixel area may be equivalent to another sub pixel area in the pixel area in which the second sub pixel area is located. The equivalent sub pixel areas of the first sub pixel area and the second sub pixel area in the same pixel area are any two sub pixel areas in the pixel area. That is, when there is an equivalent sub pixel area of the first sub pixel area in the pixel area in which the second sub pixel area is located, the equivalent sub pixel area of the first sub pixel area must not be the second sub pixel area. Accordingly, when there is an equivalent sub pixel area of the second sub pixel area in the pixel area in which the first sub pixel area is located, the equivalent sub pixel area of the second sub pixel area must not be the first sub pixel area.

In a case that the foregoing technical solution is used, the foregoing light incident from the center of the lens 200 is used as an example, the light is transmitted through the lens 200 on the photosensitive chip 400 to form the first image. Then, the lens 200 is driven to move, so that the light incident from the center of the lens 200 is projected on the photosensitive chip 400 again, forming the second image.

By designing the displacement and the displacement direction of the lens 200, the foregoing light can be projected to the first sub pixel area corresponding to the red filter in the photosensitive chip 400 through the lens 200 at the first position, and the foregoing light can be projected to the second sub pixel area corresponding to the green filter in the photosensitive chip 400 through the lens 200 at the second position. Alternatively, the foregoing light can first be projected to the first sub pixel area corresponding to the blue filter in the photosensitive chip 400, and then to the second sub pixel area corresponding to the green filter in the photosensitive chip 400. Alternatively, the foregoing light can first be projected to the first sub pixel area corresponding to the first green filter in the photosensitive chip 400, and then to the second sub pixel area corresponding to the second green filter in the photosensitive chip 400. The red filter is adjacent to a lower part of the first green filter, the blue filter is adjacent to a right part of the first green filter, while the red filter is adjacent to an upper part of the second green filter, and the blue filter is adjacent to a left part of the second green filter. That is, the position of the first green filter is different from that of the second green filter in the pixel area.

In conclusion, the filtering results of the filter corresponding to the first sub pixel area in the photosensitive chip 400 on the foregoing light are different from the filtering results of the filter corresponding to the second sub pixel area in the photosensitive chip 400 on the foregoing light, so that the same light can be processed separately by the two filters, and two images with the same content but different colors are formed. Based on the first image and the second image that are synthesized by using a preset algorithm, real photosensitive pixels of each filtering channel on the synthesized image can be increased, so that the image resolution is improved, thereby making photos present better, and improving final image quality and user experience.

As described above, designing the displacement and the displacement direction of the lens 200 can achieve a purpose that the formed first image and the second image have the same content but different colors. More specifically, the displacement of lens 200 may be a side length of the sub pixel area, and the displacement direction of lens 200 may be an extending direction of the edge of the sub pixel area, or the displacement of lens 200 may be the sum of the side length of the sub pixel area and the side lengths of n pixel areas, where n is an integer, and n≥0.

In addition, a moving direction of the lens 200 may be determined according to an actual situation. For example, a displacement of the lens 200 equal to the side length of the sub pixel area may be generated to the left in a plane perpendicular to an optical axis of the lens 200; a displacement of the lens 200 equal to the side length of the sub pixel area may be generated to the bottom in the plane perpendicular to the optical axis of the lens 200; or a displacement of the lens 200 equal to a length of a diagonal of the sub pixel area may be generated to the lower left in the plane perpendicular to the optical axis of the lens 200. This is not limited in this specification. In addition, in a case that the moving directions of the lens 200 are different, types of the filters corresponding to the first sub pixel area and the second sub pixel area are also different.

Figure 4:
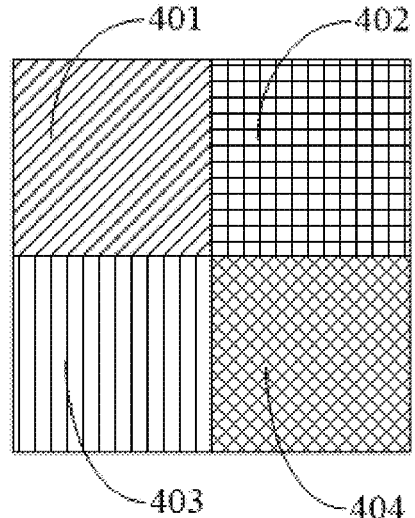
FIG. 4 is a schematic diagram of a structure of a pixel area of a photosensitive chip in a camera module according to an embodiment of this application.

More intuitively, as shown in FIG. 4, FIG. 4 shows distribution of the four sub pixel areas in each pixel area of the photosensitive chip 400, namely, the first sub pixel area 401, the second sub pixel area 402, the third sub pixel area 403, and the fourth sub pixel area 404. The first sub pixel area 401 faces the center of the lens 200 that is at the first position. That is, in a case that the lens 200 is at the first position, the light incident from the center of the lens 200 can be projected to the first sub pixel area 401. Correspondingly, after the position of the lens 200 changes, a corresponding relationship between the lens 200 and the photosensitive chip 400 also changes. Specifically, after the lens 200 moves to the second position, the second sub pixel area 402' faces the center of the lens 200. That is, in a case that the lens 200 is at the second position, the light incident from the center of the lens 200 can be projected to the second sub pixel area 402'. Although the second sub pixel area 402' and the second sub pixel area 402 can correspond to one filter, the second sub pixel area 402' and the second sub pixel area 402 may also be located in two pixel areas respectively. The pixel area in which the second sub pixel area 402' is located further includes the first sub pixel area 401', the third sub pixel area 403', and the fourth sub pixel area 404'.

Figure 5:
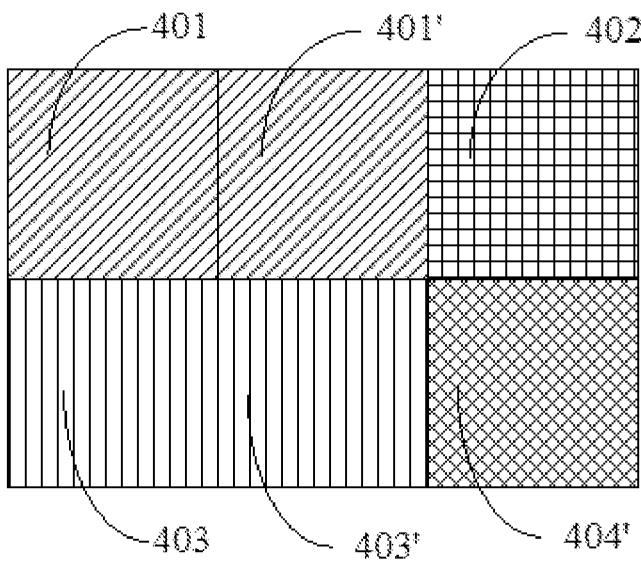
FIG. 5 is a diagram of comparison of relative positions of a pixel area in which a first sub pixel area is located and a pixel area in which a second sub pixel area is located in a camera module according to an embodiment of this application.
Figure 6:
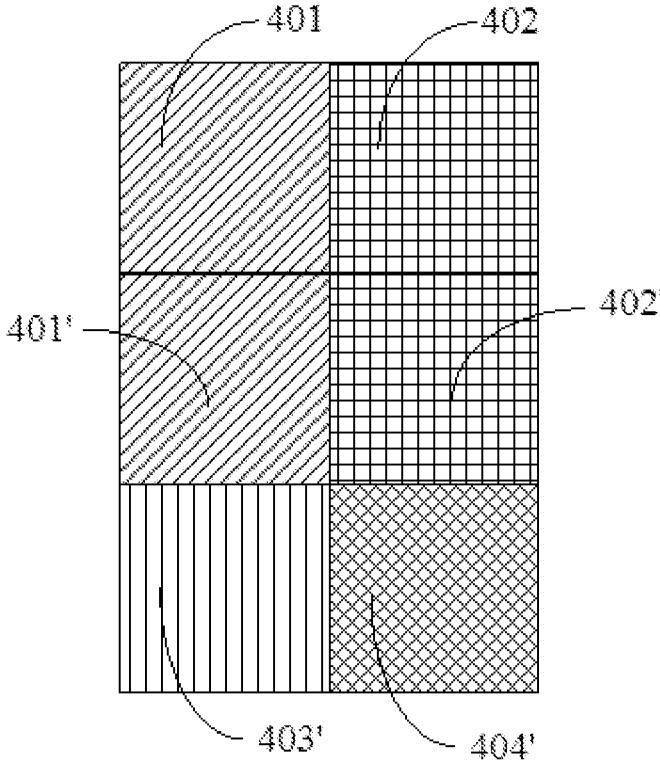
FIG. 6 is another diagram of comparison of relative positions of a pixel area in which a first sub pixel area is located and a pixel area in which a second sub pixel area is located in a camera module according to an embodiment of this application.
Figure 7:
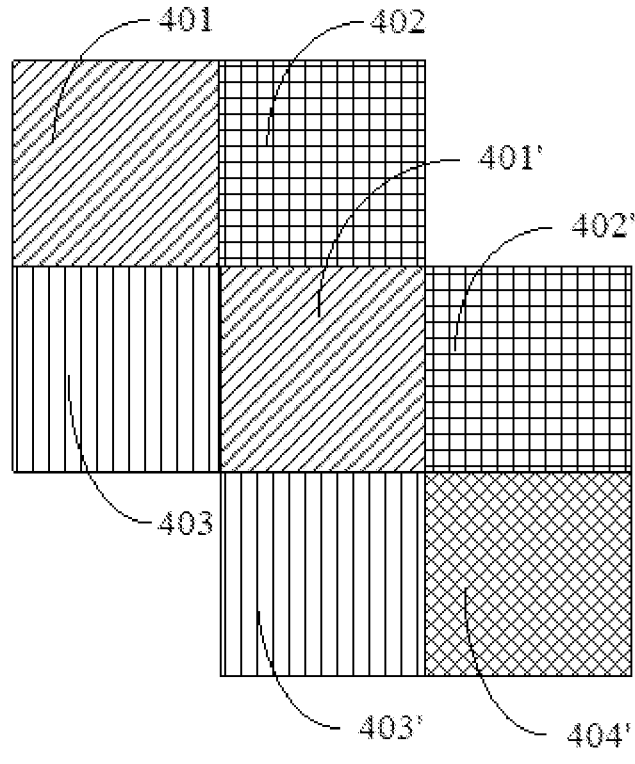
FIG. 7 is still another diagram of comparison of relative positions of a pixel area in which a first sub pixel area is located and a pixel area in which a second sub pixel area is located in a camera module according to an embodiment of this application.

In a process of driving the lens 200 to move, the displacement of the lens 200 equal to the side length of the sub pixel area is generated to the left or to the bottom in the plane perpendicular to the optical axis of the lens 200, or the displacement equal to a length of the diagonal of the sub pixel area is generated to the lower left, so that the relative positions between the pixel area in which the first sub pixel area 401 is located and the pixel area in which the second sub pixel area 402' is located correspond to FIGS. 5 to 7 respectively.

Embodiment of this application provides the camera module. The lens of the camera module fits the photosensitive chip, and the lens can switch between the first position and the second position, so that the first image and the second image can be separately formed in the first sub pixel area and the second sub pixel area of the photosensitive chip when the position of the lens changes. The content of the first image is the same as that of the second image. In addition, the equivalent sub pixel areas of the first sub pixel area and the second sub pixel area in the same pixel area are any two of the pixel areas, so that filtering processing results of the incident light by the photosensitive chip are different during the two imaging processes. And further, by synthesizing the first image and the second image by using a preset algorithm, real photosensitive pixels of each filtering channel on the formed synthesized image can be increased, so that the image resolution is improved, thereby making photos present better, and improving final image quality and user experience.

Optionally, in the camera module provided in embodiments of this application, the driving member can also drive the lens 200 to a third position. That is, the driving member can drive the lens 200 to switch between the first position, the second position, and the third position relative to the photosensitive chip 400. Specifically, there are a plurality of the driving members, or the driving member can provide driving forces in different directions. In a case that the lens 200 is at the third position, the light incident from the lens 200 forms a third image in a third sub pixel area of the photosensitive chip 400, a content of the third image is the same as that of the first image, and equivalent sub pixel areas of the first sub pixel area, the second sub pixel area, and the third sub pixel area in the same pixel area are any three of the sub pixel areas in the pixel area.

By using the foregoing technical solution, types of the filter processing results of the same light can be increased. After the first image, the second image, and the third image are synthesized by the preset algorithm, the real photosensitive pixels of each filter channel on the synthesized image can be further increased to further improve the image resolution. Specifically, by controlling the moving direction of the lens 200, the relative position relationship between the photosensitive chip 400 and the lens 200 can be changed, and then the sub pixel area corresponding to the light incident from the lens 200 can be changed. That is, the type of the filter through which the light incident from the lens 200 passes can be changed, so as to enhance the filtering processing results of the same light. Optionally, the first sub pixel area, the second sub pixel area, and the third sub pixel area can correspond to the green filter, the red filter, and the blue filter respectively, so that the resolution of the photosensitive pixels corresponding to RGB in the image can be improved, thereby making the formed image better.

Further, in the camera module provided in this embodiment of this application, the driving member can also drive the lens 200 to move to a fourth position. That is, the driving member can drive the lens 200 to switch between the first position, the second position, the third position, and the fourth position relative to the photosensitive chip 400. In a case that the lens 200 is at the fourth position, the light incident from the lens 200 forms a fourth image in a fourth sub pixel area of the photosensitive chip 400. A content of the fourth image is the same as that of the first image. Equivalent sub pixel areas of the first sub pixel area, the second sub pixel area, the third sub pixel area, and the fourth sub pixel area in the same pixel area are the four sub pixel areas in the same pixel area.

By using the foregoing technical solution, types of the filter processing results of the same light can be increased. After the first image, the second image, the third image, and the fourth image are synthesized by the preset algorithm, the real photosensitive pixels of each filter channel on the synthesized image can be further increased to further improve the image resolution. When the foregoing technical solution is used, compared with the solution in which the light is directly incident on the photosensitive chip, resolution of an R image and a B image is tripled, and resolution of a G image is double, thereby greatly improving the image resolution.

In a process of driving the lens 200 by the driving member, by accurately controlling a distance the driving member moves, it can be ensured that the lens 200 can move a preset displacement when the lens is moved. The preset displacement may be equal to the side length of the sub pixel area. To reduce difficulty of controlling the camera module, in another embodiment of this application, optionally, the camera module further includes a limiting member 600, and the lens is in movable fit with the photosensitive chip by using the limiting member.

The limiting member 600 includes a limiting base 601 and a connecting part 602, and the limiting base 601 is in movable fit with the connecting part 602. Both the lens 200 and a driving head of the driving member can be connected to the limiting base 601, or to the connecting part 602, so that the displacement of the lens 200 can be controlled with the help of a limiting fit relationship between the limiting base 601 and the connecting part 602. For example, the limiting base 601 may be fixed on the housing 100, and both the lens 200 and the driving head of the driving member are connected to the connecting part 602.

The limiting base 601 is provided with a first limiting groove 6031, a second limiting groove 6032, a third limiting groove 6033 and a fourth limiting groove 6034. The first limiting groove 6031, the second limiting groove 6032, the third limiting groove 6033, and the fourth limiting groove 6034 are connected to each other to form a movable space 603, so as to ensure that the connecting part 602 can move in the movable space and is in limiting fit with the above four limiting grooves.

In a case that the connecting part 602 is limited in the first limiting groove 6031, the lens 200 is at the first position. In a case that the connecting part 602 is limited in the second limiting groove 6032, the lens 200 is at the second position. In a case that the connecting part 602 is limited in the third limiting groove 6033, the lens 200 is at the third position. In a case that the connecting part 602 is limited in the fourth limiting groove 6034, the lens 200 is at the fourth position.

In general, the foregoing technical solution can be used to limit the displacement of the lens 200 by using the limiting element 600. When the lens needs to be moved, the connecting part is driven to a corresponding position by the driving member, and the limiting base 601 can provide a reliable limiting function. Therefore, when the connecting part cannot continue to move to the corresponding direction, it can be considered that the lens has been driven to a target position, thereby reducing difficulty of controlling the moving distance of the driving member.

Specifically, specific sizes and structures of the first limiting groove 6031, the second limiting groove 6032, the third limiting groove 6033, and the fourth limiting groove 6034 can be determined according to an actual condition such as a size and shape of the connecting part. Optionally, the first limiting groove 6031, the second limiting groove 6032, the third limiting groove 6033, and the fourth limiting groove 6034 may all be square structural members, and their sizes are the same as that of the sub pixel area. Correspondingly, to ensure that the connecting part can be normally limited, the connecting part can also be a cylindrical structure with a square bottom.

Optionally, the foregoing four limiting grooves can be connected to each other to form a square structure. That is, the four limiting grooves separately correspond to the four sub pixel areas in the pixel area, and are arrange 2 by 2. In this case, when the connecting part 602 separately fits the four limiting grooves, the lens 200 may be located at the first position, the second position, the third position, and the fourth position separately, thereby forming the first image, the second image, the third image, and the fourth image on the photosensitive chip 400.

In another embodiment of this application, the second limiting groove 6032 is connected to the third limiting groove 6033, the first limiting groove 6031 is located on one side along a distribution direction of the second limiting groove 6032 and the third limiting groove 6033, and the fourth limiting groove 6034 is located on the other side of the distribution direction. The first limiting groove 6031 is connected to the second limiting groove 6032, and the fourth limiting groove 6034 is connected to the third limiting groove 6033. In general, it can be considered that the second limiting groove 6032 is connected to the right part of the first limiting groove 6031, the third limiting groove 6033 is connected to the lower part of the second limiting groove 6032, and the fourth limiting groove 6034 is connected to the right part of the third limiting groove 6033, so as to form a Z-shaped structure.

In a case that the foregoing technical solution is used, when the connecting part 602 moves between any two adjacent limiting grooves of the four limiting grooves, the connecting part 602 can be limited by using the limiting base 601 in one direction. In addition, combining the driving force provided by the driving member, there is only one movement direction of the connecting part 602, thereby further reducing difficulty of driven movement and improve movements accuracy.

As described above, a size of the first limiting groove 6031 and the like on the limiting base can be determined according to parameters such as the structure and size of the connecting part. Optionally, in the distribution direction of the first limiting groove 6031 and the second limiting groove 6032, and in the distribution direction of the second limiting groove 6032 and the third limiting groove 6033, the size of the connecting part is equal to the size of the sub pixel area. In this case, the shapes and sizes of bottom surfaces of the first limiting groove 6031, the second limiting groove 6032 the third limiting groove 6033, and the fourth limiting groove 6034 are the same as the shape and size of the sub pixel area respectively correspondingly, so that design and processing difficulty of the first limiting groove 6031 and the like is lower, and it can be ensured that there is a more reliable limiting relationship between the connecting part and each limiting groove. Specifically, the connecting part may be a cylindrical structural member with a square bottom. In another embodiment of this application, the connecting part 602 may be a cylindrical structural member. In this case, a contact area between the connecting part 602 and the limiting base 601 is small, which can reduce the difficulty of their relative movement and difficulty of driven movements.

The optical axis of the lens is perpendicular to a photosensitive surface of the photosensitive chip 400, that is, the photosensitive chip faces the lens. In this case, the design and installation difficulty of lens and photosensitive chip is lower, and sensitivity of photosensitive chip 400 and imaging quality are improved. Certainly, in a case that here is a corresponding requirement, the photosensitive chip 400 may unnecessarily be opposite the lens 200. For example, the camera module may be set as a periscope module, which can improve a zoom ratio of the camera module.

Optionally, the camera module provided in this embodiment of this application further includes an infrared cut-off filter 500. The infrared cut-off filter 500 is disposed on a light output side of the lens, that is, on a light input side of the photosensitive chip 400. With the help of the infrared cut-off filter 500, the light incident into the camera module by using the lens 200 can be filtered, so that unnecessary light projected to the photosensitive chip 400 can be filtered, thereby preventing the photosensitive chip 400 from generating false colors and/or ripples, and improving effective resolution and color reduction of the photosensitive chip 400.

Optionally, the lens 200 is an extended depth of field lens. Passing focuses of R, G, and B filtering channels of the lens 200 are designed to be located at different positions, and the three passing focuses cover three focal segments, so that longitudinal chromatic aberration of the R, G, and B bands is enlarged to cover far, middle, and near distances. The far, middle, and near distances are relative concepts. That is, the far distance is a greater distance compared with the middle distance, and the near distance is a shorter distance compared with the middle distance.

The lens 200 uses the foregoing technical solution, three pictures correspond to R, G and B, and the three pictures focus on the foregoing three distances, namely, far, middle, and near. After this, based on a restoration algorithm, a window detection function can be used to detect the entire field of view area, and determine which of the three photos corresponding to R, G and B in each window is the clearest. Then, based on the clearest photo, the other two photos can be used for resolution transformation with the help of a deconvolution algorithm to synthesize photos that are relatively clear in any distance.

Based on the camera module disclosed according to any one of the foregoing embodiments, the embodiments of this application further provide an electronic device. The electronic device includes the camera module provided in any one of the foregoing embodiments. Certainly, the electronic device further includes a display module, a housing, a battery, and another device. For brevity, this is not repeatedly described herein.

The electronic device disclosed in embodiments of this application may be a smart phone, a tablet computer, an e-book reader, or a wearable device. Certainly, the electronic device may also be another device. This is not limited in embodiments of this application.

The foregoing embodiments of this application focus on describing differences between the embodiments, and different optimization features of the embodiments may be combined to form better embodiments provided that they are not contradictory. For brevity, details are not described herein again.

The foregoing descriptions are merely embodiments of this application, and are not intended to limit this application. Various changes and modifications may be made to this application by a person skilled in the art. Any modifications, equivalent replacements, improvements, and the like made without departing from the spirit and principle of this application shall fall within the scope of the claims of this application.

The invention claimed is:

1. A camera module, comprising a lens, a driving member, and a photosensitive chip, wherein the photosensitive chip is a Bayer array sensor, the photosensitive chip comprises a plurality of pixel areas that are arranged in rows and columns, and each pixel area comprises four sub pixel areas, wherein the lens is connected to the driving member, and the driving member can drive the lens to switch between a first position, a second position, a third position, and a fourth position relative to the photosensitive chip; and in a case that the lens is at the first position, light incident from the lens forms a first image in a first sub pixel area of the photosensitive chip; in a case that the lens is at the second position, the light incident from the lens forms a second image in a second sub pixel area of the photosensitive chip;

in a case that the lens is at the third position, the light incident from the lens forms a third image in a third sub pixel area of the photosensitive chip;

in a case that the lens is at the fourth position, the light incident from the lens forms a fourth image in a fourth sub pixel area of the photosensitive chip; contents of the first image, second image, the third image and the fourth image are the same; and equivalent sub pixel areas of the first sub pixel area, the second sub pixel area, the third sub pixel area, and the fourth sub pixel area in the same pixel area are the four sub pixel areas in the same pixel area;

wherein the camera module further comprises a limiting member, the lens is in movable fit with the photosensitive chip by using the limiting member, the limiting member comprises a limiting base and a connecting part, and the limiting base or the connecting part is connected to the driving member; and the limiting base is provided with a first limiting groove, a second limiting groove, a third limiting groove, and a fourth limiting groove that communicate with each other;

wherein in a distribution direction of the first limiting groove and the second limiting groove, and in a distribution direction of the second limiting groove and the third limiting groove, a size of the connecting part is equal to a side length of the sub pixel area.

2. The camera module according to claim 1,
wherein in a case that the connecting part is limited in the first limiting groove, the lens is at the first position; in a case that the connecting part is limited in the second limiting groove, the lens is at the second position; in a case that the connecting part is limited in the third limiting groove, the lens is at the third position; and in a case that the connecting part is limited in the fourth limiting groove, the lens is at the fourth position.

3. The camera module according to claim 2, wherein the second limiting groove is connected to the third limiting groove, the first limiting groove is located on one side along a distribution direction of the second limiting groove and the third limiting groove, the fourth limiting groove is located on the other side along the distribution direction, the first limiting groove is connected to the second limiting groove, and the fourth limiting groove is connected to the third limiting groove.

4. The camera module according to claim 1, wherein the connecting part is a cylindrical structural member.

5. The camera module according to claim 1, wherein the camera module further comprises an infrared cut-off filter, and the infrared cut-off filter is disposed on a light output side of the lens.

6. The camera module according to claim 1, wherein the lens is an extended depth of field lens.

7. An electronic device, comprising a camera module;
wherein the camera module comprises a lens, a driving member, and a photosensitive chip, wherein the photosensitive chip is a Bayer array sensor, the photosensitive chip comprises a plurality of pixel areas that are arranged in rows and columns, and each pixel area comprises four sub pixel areas, wherein the lens is connected to the driving member, and the driving member can drive the lens to switch between a first position, a second position, a third position, and a fourth position relative to the photosensitive chip; and in a case that the lens is at the first position, light incident from the lens forms a first image in a first sub pixel area of the photosensitive chip; in a case that the lens is at the second position, the light incident from the lens forms a second image in a second sub pixel area of the photosensitive chip;

in a case that the lens is at the third position, the light incident from the lens forms a third image in a third sub pixel area of the photosensitive chip;

in a case that the lens is at the fourth position, the light incident from the lens forms a fourth image in a fourth sub pixel area of the photosensitive chip; contents of the first image, second image, the third image and the fourth image are the same; and equivalent sub pixel areas of the first sub pixel area, the second sub pixel area, the third sub pixel area, and the fourth sub pixel area in the same pixel area are the four sub pixel areas in the same pixel area;

wherein the camera module further comprises a limiting member, the lens is in movable fit with the photosensitive chip by using the limiting member, the limiting member comprises a limiting base and a connecting part, and the limiting base or the connecting part is connected to the driving member; and the limiting base is provided with a first limiting groove, a second limiting groove, a third limiting groove, and a fourth limiting groove that communicate with each other;

wherein in a distribution direction of the first limiting groove and the second limiting groove, and in a distribution direction of the second limiting groove and the third limiting groove, a size of the connecting part is equal to a side length of the sub pixel area.

8. The electronic device according to claim 7,
wherein in a case that the connecting part is limited in the first limiting groove, the lens is at the first position; in a case that the connecting part is limited in the second limiting groove, the lens is at the second position; in a case that the connecting part is limited in the third limiting groove, the lens is at the third position; and in a case that the connecting part is limited in the fourth limiting groove, the lens is at the fourth position.

9. The electronic device according to claim 8, wherein the second limiting groove is connected to the third limiting groove, the first limiting groove is located on one side along a distribution direction of the second limiting groove and the third limiting groove, the fourth limiting groove is located on the other side along the distribution direction, the first limiting groove is connected to the second limiting groove, and the fourth limiting groove is connected to the third limiting groove.

10. The electronic device according to claim 7, wherein the connecting part is a cylindrical structural member.

11. The electronic device according to claim 7, wherein the camera module further comprises an infrared cut-off filter, and the infrared cut-off filter is disposed on a light output side of the lens.

12. The electronic device according to claim 7, wherein the lens is an extended depth of field lens.

* * * * *